(12) United States Patent
Tan

(10) Patent No.: US 12,445,661 B2
(45) Date of Patent: Oct. 14, 2025

(54) VIRTUAL OBJECT INTERACTION METHOD, APPARATUS, STORAGE MEDIUM AND COMPUTER PROGRAM PRODUCT

(71) Applicant: Hangzhou AliCloud Feitian Information Technology Co., Ltd., Hangzhou (CN)

(72) Inventor: Qimin Tan, Hangzhou (CN)

(73) Assignee: Hangzhou AliCloud Feitian Information Technology Co., Ltd., Hangzhou (CN)

( * ) Notice: Subject to any disclaimer, the term of this patent is extended or adjusted under 35 U.S.C. 154(b) by 0 days.

(21) Appl. No.: 18/685,209

(22) PCT Filed: Oct. 20, 2022

(86) PCT No.: PCT/CN2022/126523
§ 371 (c)(1),
(2) Date: Feb. 20, 2024

(87) PCT Pub. No.: WO2023/071917
PCT Pub. Date: May 4, 2023

(65) Prior Publication Data
US 2025/0142137 A1    May 1, 2025

(30) Foreign Application Priority Data
Oct. 26, 2021 (CN) .......................... 202111245048.5

(51) Int. Cl.
*H04N 21/2187* (2011.01)
*G06T 13/40* (2011.01)

(52) U.S. Cl.
CPC ......... *H04N 21/2187* (2013.01); *G06T 13/40* (2013.01)

(58) Field of Classification Search
None
See application file for complete search history.

(56) References Cited

U.S. PATENT DOCUMENTS 5,682,469 A * 10/1997 Linnett ............... G06F 3/04817
345/473
5,727,174 A * 3/1998 Aparicio, IV ...... G06F 3/04817
715/977
(Continued)

FOREIGN PATENT DOCUMENTS

CN     1770746 A *  5/2006
CN   104469444 A *  3/2015
(Continued)

OTHER PUBLICATIONS

Tyler Fisbee, "Clippy", https://www.youtube.com/watch?v=3G_uCbKoG5A, retrieved on Oct. 15, 2024.
(Continued)

*Primary Examiner* — William J Kim
(74) *Attorney, Agent, or Firm* — Maschoff Brennan

(57) ABSTRACT

Embodiments of the present application provide a virtual object interaction method, an apparatus, a storage medium and a computer program product, and the virtual object interaction method includes: performing a live stream by using a first virtual streamer in a first live stream room of a live stream platform; making a virtual interactive object appear in the first live stream room for a preset time period during the live stream of the first live stream room, and the preset time period is shorter than a time period of the live stream in the first live stream room; where the first virtual streamer performs a live stream task set by the using party of the first live stream room, and the virtual interactive object performs an interactive task set by a manager of the live stream platform.

19 Claims, 5 Drawing Sheets

(56) References Cited

U.S. PATENT DOCUMENTS

| | | | | |
|---|---|---|---|---|
| 6,021,403 | A * | 2/2000 | Horvitz | G06N 5/00 706/45 |
| 6,369,821 | B2 * | 4/2002 | Merrill | G06F 8/00 345/949 |
| 6,657,643 | B1 * | 12/2003 | Horvitz | G06Q 10/109 715/764 |
| 6,931,656 | B1 * | 8/2005 | Eshelman | H04N 21/47 345/473 |
| 10,521,188 | B1 * | 12/2019 | Christie | H04N 21/42203 |
| 12,088,887 | B2 * | 9/2024 | Yang | H04N 21/4316 |
| 2002/0187833 | A1 * | 12/2002 | Nishiyama | A63F 13/655 463/40 |
| 2004/0199057 | A1 * | 10/2004 | Hasegawa | A61B 5/0205 600/595 |
| 2008/0081694 | A1 * | 4/2008 | Hong | A63F 13/80 463/34 |
| 2009/0019541 | A1 * | 1/2009 | Fontijn | G06F 21/34 726/19 |
| 2009/0204909 | A1 * | 8/2009 | Hornbaker | H04N 21/4781 345/473 |
| 2015/0161521 | A1 * | 6/2015 | Shah | G06F 3/0481 715/705 |
| 2015/0382047 | A1 * | 12/2015 | Van Os | H04N 21/84 725/38 |
| 2017/0084189 | A1 * | 3/2017 | Rubalcaba | G09B 7/04 |
| 2017/0374426 | A1 * | 12/2017 | Wang | H04N 21/25891 |
| 2018/0098030 | A1 * | 4/2018 | Morabia | H04L 65/403 |
| 2018/0183844 | A1 * | 6/2018 | Danker | H04N 21/4756 |
| 2018/0373547 | A1 * | 12/2018 | Dawes | H04N 21/4788 |
| 2019/0318318 | A1 * | 10/2019 | Sergott | H04L 51/02 |
| 2019/0373303 | A1 * | 12/2019 | Ashraf | G06F 3/167 |
| 2021/0029339 | A1 | 1/2021 | Liu et al. | |
| 2021/0099761 | A1 * | 4/2021 | Zhang | H04N 21/233 |
| 2021/0104100 | A1 * | 4/2021 | Whitney | G06T 13/40 |
| 2022/0239988 | A1 * | 7/2022 | Yang | H04N 21/4725 |

FOREIGN PATENT DOCUMENTS

| | | | | |
|---|---|---|---|---|
| CN | 106028166 | A | 10/2016 | |
| CN | 106993195 | A * | 7/2017 | G06F 3/011 |
| CN | 107277599 | A * | 10/2017 | G06F 3/011 |
| CN | 107423809 | A | 12/2017 | |
| CN | 109120985 | A * | 1/2019 | G06K 9/00268 |
| CN | 109688477 | A | 4/2019 | |
| CN | 110850983 | A | 2/2020 | |
| CN | 111083570 | A * | 4/2020 | |
| CN | 111343473 | A | 6/2020 | |
| CN | 111652678 | A | 9/2020 | |
| CN | 112188297 | A | 1/2021 | |
| CN | 112291576 | A | 1/2021 | |
| CN | 112929678 | A | 6/2021 | |
| CN | 113329234 | A | 8/2021 | |
| CN | 113382270 | A | 9/2021 | |
| CN | 113691829 | A | 11/2021 | |
| CN | 115314729 | A * | 11/2022 | H04N 21/2187 |
| FR | 3023020 | A1 * | 1/2016 | G02B 27/0093 |
| TW | 202123128 | A | 6/2021 | |

OTHER PUBLICATIONS

International Search Report and Written Opinion, as issued in connection with European Patent Application No. 22885794.2, dated Oct. 28, 2024.

Office Action mailed Nov. 30, 2021, in Chinese Application No. 202111245048.5.

Office Action mailed Dec. 22, 2021, in Chinese Application No. 202111245048.5.

International Search Report mailed Dec. 6, 2022, in PCT Application No. PCT/CN2022/126523.

Notification to Grant Patent Right for Invention mailed Jan. 13, 2022, in Chinese Application No. 202111245048.5.

* cited by examiner

VIRTUAL OBJECT INTERACTION METHOD, APPARATUS, STORAGE MEDIUM AND COMPUTER PROGRAM PRODUCT

CROSS-REFERENCE TO RELATED APPLICATIONS

The present application is a National Stage of International Application No. PCT/CN2022/126523, filed on Oct. 20, 2022, which claims priority to Chinese Patent Application No. 202111245048.5, titled "VIRTUAL OBJECT INTERACTION METHOD, APPARATUS, STORAGE MEDIUM AND COMPUTER PROGRAM PRODUCT", filed to China National Intellectual Property Administration on Oct. 26, 2021. These applications are hereby incorporated by reference in their entireties.

TECHNICAL FIELD

Embodiments of the present application relate to the technical field of electronic information, in particular to a virtual object interaction method, an apparatus, a storage medium and a computer program product.

BACKGROUND

With the rise of live stream platforms, more and more users use a live video to promote all kinds of information in a live stream room of the live stream platform, for example, selling goods on the live stream platform, teaching on the live stream platform, performing on the live stream platform and so on. In a live stream activity, it is necessary for a streamer to carry out live stream activities continuously in the live stream room, and labor cost is very high. In order to reduce the labor cost, in the related technology, a virtual streamer is set in the live stream room and used for live stream activities. However, when users watch the live video, there is limited interaction between the virtual streamer and the users watching the live video, causing poor effect of the live stream.

SUMMARY

In view of this, embodiments of the present application provide a virtual object interaction method, an apparatus, a storage medium and a computer program product to at least partially solve the above problems.

According to a first aspect of an embodiment of the present application, a virtual object interaction method is provided, which is applied to a live stream platform, where the live stream platform provides one or more live stream rooms for a using party to conduct a live stream activity, the method including: performing a live stream by using a first virtual streamer in a first live stream room of the live stream platform; making a virtual interactive object appear in the first live stream room for a preset time period during a live stream of the first live stream room, and the preset time period is shorter than a time period of the live stream of the first live stream room; where the first virtual streamer performs a live stream task set by the using party of the first live stream room, and the virtual interactive object performs an interactive task set by a manager of the live stream platform.

According to a second aspect of an embodiment of the present application, a virtual object interactive apparatus is provided, which is applied to a live stream platform that provides one or more live stream rooms for a using party to conduct a live stream activity, the apparatus including: a live stream module, configure to perform a live stream by using a first virtual streamer in a first live stream room of the live stream platform; an interaction module, configured to make a virtual interactive object appear in the first live stream room for a preset time period during the live stream of the first live stream room, where the preset time period is shorter than a time period of the live stream of the first live stream room; where the first virtual streamer performs a live stream task set by the using party of the first live stream room, and the virtual interactive object performs an interactive task set by the manager of the live stream platform.

According to a third aspect of an embodiment of the present application, an electronic device is provided, including a display, a processor and a memory; the display is configured to display a live stream interface of a live stream room, and the live stream interface comprises an streamer area and an interactive area, where the streamer area is used to display a virtual streamer and the interactive area is used to display a virtual interactive object; a memory is configured to store executable instructions and data related to the virtual object interaction method; and the processor is configured to execute operation corresponding to the virtual object interaction method according to the executable instructions and data read from the memory.

According to a fourth aspect of an embodiment of the present application, there is provided a storage medium on which a computer program is stored, which, when executed by a processor, realizes the virtual object interaction method according to the first aspect.

According to a fifth aspect of an embodiment of the present application, there is provided a computer program product which, when executed by a processor, realizes the virtual object interaction method according to the first aspect.

In the virtual object interaction method, the apparatus, the storage medium and the computer program product provided by embodiments of the present application, the live stream is performed by using first virtual streamer in the first live stream room of the live stream platform. During the live stream of the first live stream room, the virtual interactive object is made appear in the first live stream room for a preset time period, and the preset time period is shorter than a time period of the live stream of the first live stream room. The first virtual streamer performs a live stream task set by a using party of the first live stream room, and the virtual interactive object performs an interactive task set by a manager of the live stream platform. As the virtual interactive object performs the interactive task set by the manager of the live stream platform and does not interfere with the live stream task performed by the virtual streamer, interaction in the live stream room is increased and live stream effect is improved without affecting the live stream task.

BRIEF DESCRIPTION OF DRAWINGS

In order to explain technical schemes in the embodiments of the present application or the prior art more clearly, drawings needed in the description of the embodiments or the prior art will be briefly introduced below. Obviously, the drawings in the following description are only some embodiments recorded in the embodiments of the present application, and for those skilled in the art, other drawings can be obtained according to these drawings.

DESCRIPTION OF EMBODIMENTS

In order to make those skilled in the art better understand the technical scheme in the embodiments of the present application, the technical scheme in the embodiments of the present application will be described clearly and completely with the accompanying drawings in the embodiments of the present application. Obviously, the described embodiment is only a part of the embodiments of the present application, but not all of the embodiments. Based on the embodiments in the present application, all other embodiments obtained by those skilled in the art should belong to the protection scope of the embodiments in the present application.

The specific implementation of the embodiments of the present application will be further explained with reference to the accompanying drawing in the embodiments of the present application.

Embodiment 1

Embodiment 1 of the present application provides a virtual object interaction method, which is applied to an electronic device. In order to facilitate understanding, an application scenario of the virtual object interaction method provided in the embodiment 1 of the present application is described, with reference to FIG. 1, which is a schematic scene diagram of the virtual object interaction method provided by the embodiment 1 of the present application.

Figure 1:
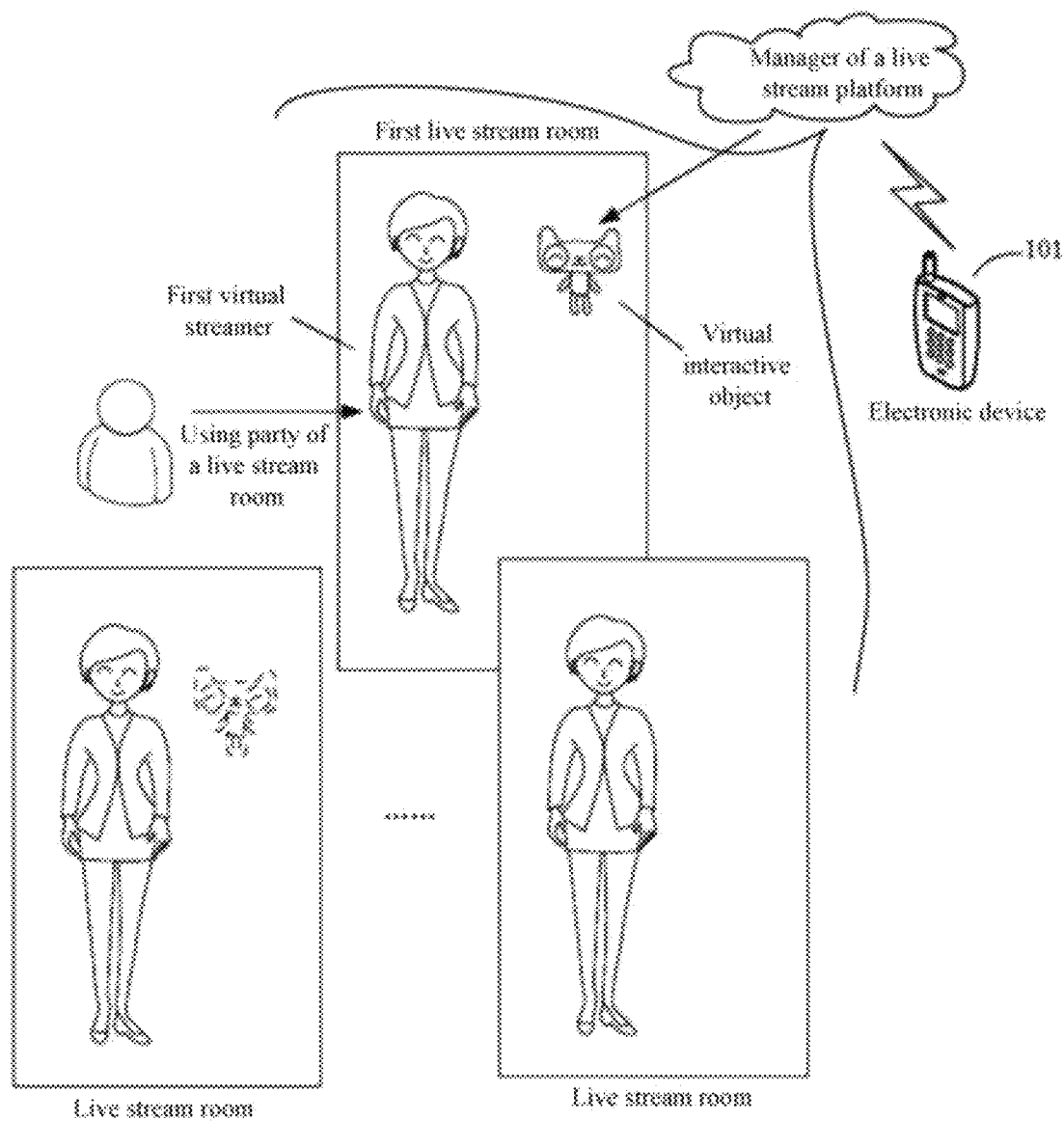
FIG. 1 is a schematic scene diagram of a virtual object interaction method provided by embodiment 1 of the present application.

The electronic device shown in FIG. 1 can be applied to a live stream platform, which provides one or more live stream rooms for a using party to conduct live stream activities. FIG. 1 shows three live stream platforms, which are only schematic, and does not mean that the present application is limited to this. Each live stream platform can have a streamer for a live stream to accomplish a live stream task set by the using party of the live stream room. The streamer can be a virtual streamer or a real streamer. For example, a first live stream room uses a first virtual streamer for a live stream. During the live stream, a virtual interactive object can appear in the live stream room for a preset time period, and the virtual interactive object can appear in any live stream room of the live stream platform to perform a task set by a manager of the live stream platform and interact with a user watching the live stream.

It should be noted that the electronic device 101 can be a terminal device such as a smart phone, a tablet computer, a notebook computer, a vehicle-mounted terminal, etc., and the electronic device 101 can also be a network device such as a server. Of course, this is only an exemplary explanation, which does not mean that the present application is limited to this.

The electronic device 101 can access a network, connect with a cloud through the network, and perform data interaction, or the electronic device 101 can be a device in the cloud. In the present application, the network includes Local Area Network (LAN), Wide Area Network (WAN) and mobile communication network, such as World Wide Web (WWW), Long Term Evolution (LTE) network, 2G network (2th Generation Mobile Network), 3G network (3th Generation Mobile Network), 5G network (5th Generation Mobile Network) and so on. The cloud can include various devices connected through the network, such as a server, a relay device, and a Device-to-Device (D2D) device. Of course, this is only an exemplary explanation, which does not mean that the present application is limited to this.

Figure 2:
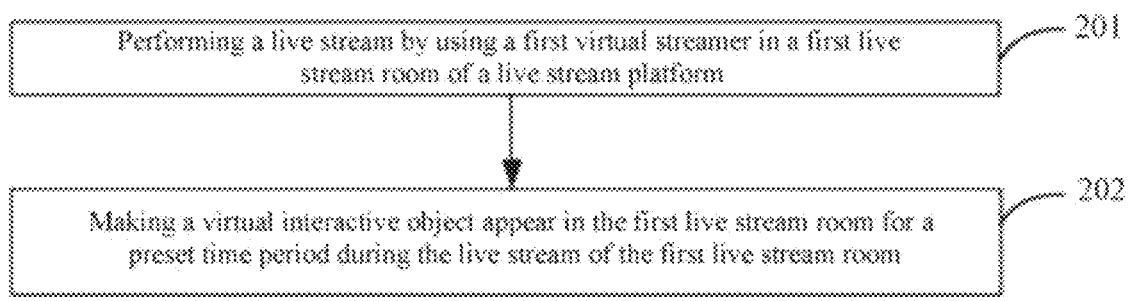
FIG. 2 is a flowchart of a virtual object interaction method provided by embodiment 1 of the present application.

Combined with the scene shown in FIG. 1, the virtual object interaction method provided by the embodiment 1 of the present application is described in detail. It should be noted that FIG. 1 is only an application scenario of the virtual object interaction method provided by the embodiment 1 of the present application, which does not mean that the virtual object interaction method must be applied to the scenario shown in FIG. 1. The virtual object interaction method can be specifically applied to an electronic device. The virtual object interaction method is applied to a live stream platform, and the live stream platform provides one or more live streams for a using party to conduct a live stream activity. Referring to FIG. 2, which is the flow chart of a virtual object interaction method provided by the embodiment 1 of the present application, and the method includes the following steps:

Step 201: Performing a Live Stream by Using a First Virtual Streamer in a First Live Stream Room of a Live Stream Platform.

It should be noted that in the present application, the live stream platform can be any network platform that provides a live stream function, that is, any one network platform that provides multiple live stream rooms for a user to conduct live stream activities. The first live stream room can be any live stream room on the live stream platform, and the present application only takes the first live stream room as an example for illustration. A first live stream room can be established on the live stream platform, so that the first virtual streamer can be used for a live stream.

It should also be noted that if the electronic device is a terminal device, step 201 may be that the terminal device displays a live interface of the first live stream room, receives a live video of the first virtual streamer, and displays the live video of the first virtual streamer on the live interface of the first live stream room. If the electronic device is a server of the live stream platform, step 201 may be that the server establishes the first live stream room and sends the live video of the first streamer to a terminal device corresponding to the first live stream room, and the terminal device corresponding to the first live stream room refers to the terminal device used by a user watching the live stream of the first live stream room.

Step 202: Making the Virtual Interactive Object Appear in the First Live Stream Room For a Preset Time Period During the Live Stream of the First Live Stream Room.

Where the preset time period is less than a time period of the live stream of the first live stream room. The first virtual streamer performs a live stream task set by the using party of the first live stream room, and the virtual interactive object performs an interactive task set by a manager of the live stream platform. The interactive task performed by the virtual interactive object and the live stream task performed by the first virtual streamer are independent of each other and do not interfere with each other. When the first virtual streamer is performing the live stream task, make the virtual interactive object perform the interactive task, which can increase interaction with the user in the first live stream room and improve live stream effect.

Here, two specific application scenarios are listed to illustrate the interactive task of the virtual interactive object.

In an implementation, in a first application scenario, interactive information can be obtained, and the virtual interactive object can perform the interactive task set by the live stream platform based on the interactive information. Obtaining the interactive information can be generating the interactive information by the electronic device, or receiving the interactive information sent from other devices, or generating the interactive information based on user's input. Illustratively, the method further includes generating the interactive information based on the virtual interactive object, and the interactive information is related to the interactive tasks that required to be performed by the virtual interactive object. Illustratively, the interactive information may indicate the interactive task that required to be performed by the virtual interactive object. If the electronic device is a terminal device, the obtaining the interactive information can be receiving the interactive information sent by the server. If the electronic device is a server of the live stream platform, the obtaining the interactive information can be obtaining preset interactive information, and the server can also send the interactive information to the terminal device.

In the first application scenario, two specific examples are cited to explain the interactive information in detail.

In an implementation, in a first example, the interactive information can be generated based on an interactive input of the user, for example, generating the interactive information based on the virtual interactive object includes: displaying an interactive prompt related to the virtual interactive object, and the interactive prompt is used to prompt the user to make the interactive input; receiving user's interactive input to the virtual interactive object, and generating interactive information according to the interactive input. In an implementation, the user's interactive input can indicate an interactive behavior of the virtual interactive object, for example, generating interactive information according to the interactive input includes determining interactive behavior corresponding to the virtual interactive object according to the interactive input, and generating interactive information based on the interactive behavior, and the interactive behavior includes an action and a gesture of the virtual interactive object interacting with the user. Illustratively, the interactive behavior may include various actions and gestures such as running, yawning, waving, and so on.

Figure 3:
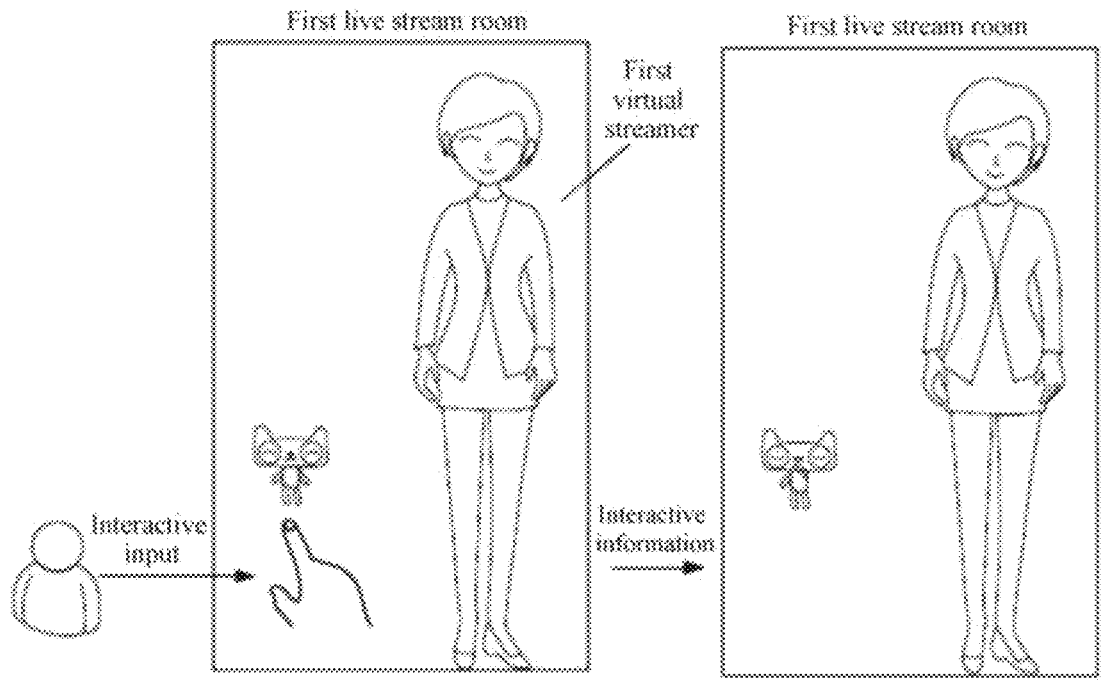
FIG. 3 is a schematic diagram of an interactive effect provided by embodiment 1 of the present application.

The interaction behavior is indicated by the user, which makes interaction between the virtual interactive object and the user more flexible and meets needs of different users. As shown in FIG. 3, if the electronic device is a terminal device, the user can make interactive input through touch operation on the touch screen of the terminal device, or through voice control, gesture control, etc. Different interactive inputs can correspond to different interactive behaviors. The terminal device receives the user's interactive input, determines the interactive behavior of the virtual interactive object according to the interactive input, generates interactive information, and displays the interactive behavior of the virtual interactive object according to the interactive information. If the electronic device is a server, it can receive the interactive input sent by the terminal device, generate interactive information according to the interactive input, and then send the interactive information to the terminal device.

Figure 4:
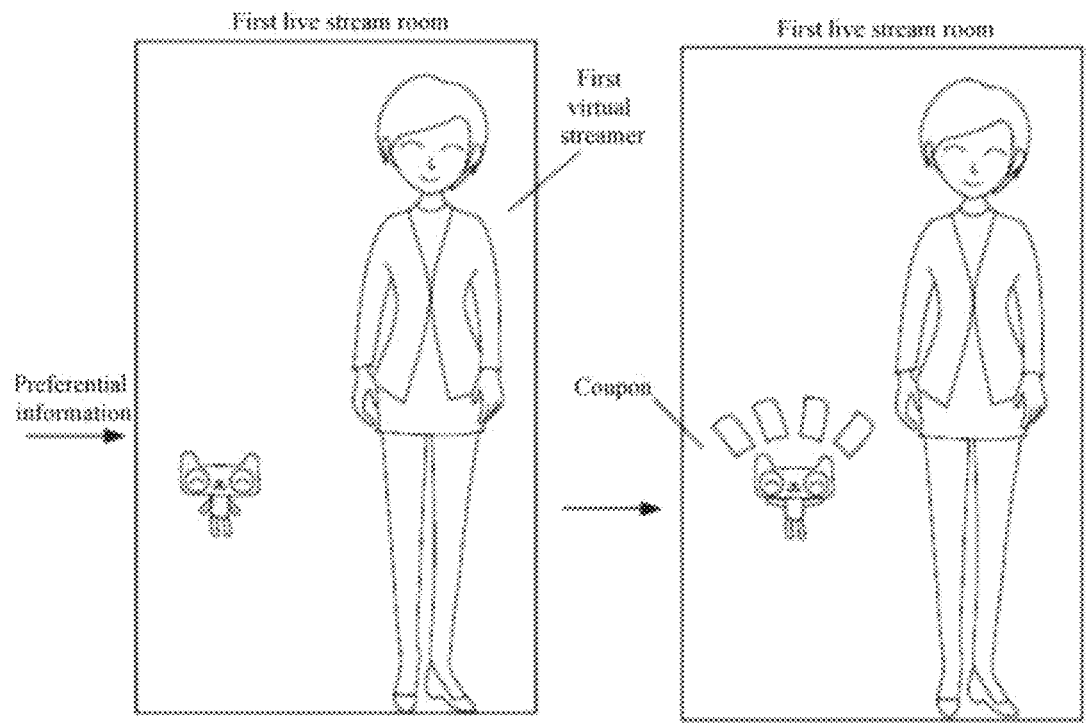
FIG. 4 is a schematic diagram of an interactive effect provided by embodiment 1 of the present application.

In an implementation, in a second example, the interactive information can be generated based on key information of a live stream target, for example, generating the interactive information based on the virtual interactive object includes obtaining the key information of the live stream target included in a live stream content according to the live stream content of the first virtual streamer, and generating the interactive information based on the key information. Illustratively, the live stream target can be any target involved in the live stream content, for example, the live stream target can be a target commodity, a target character, a target video, and the like. Taking the live stream target being a target commodity as an example, the key information may include preferential information of the target commodity. According to the live stream content of the first virtual streamer, the preferential information of the target commodity included in the live stream content is obtained, and interactive information is generated based on the preferential information. Illustratively, the preferential information may include coupons, red packets, and the like. The preferential information can be displayed in images through the virtual interactive object. For example, as shown in FIG. 4, the image of coupons distributed by the virtual interactive object is displayed, and the information of coupons, namely interactive information, is displayed when the user's input of getting coupons is received. Or, a voice could be played through the virtual interactive object to tell the user how to get commodity discounts. Of course, the above is only illustrative.

In an further implementation, obtaining the key information of the live stream target included in the live stream content according to the live stream content of the first virtual streamer includes obtaining text information of the live stream content of the first virtual streamer; performing semantic recognition on the text information, determining the live stream target included in the live stream content according to a result of the semantic recognition, and obtaining the key information of the live stream target. By determining the live stream target according to the text information of the live stream content of the first virtual streamer, the user watching the live stream of the first virtual streamer can get to know the key information of the live stream target related to the current live stream content, thus enhancing live stream effect and improving user experience.

In an implementation, in the second application scenario, the interactive task may include performing an interactive task set by the live stream platform based on guidance information. Illustratively, the method further includes: when the virtual interactive object appears in the first live stream room of the live stream platform, providing guidance information corresponding to a second live stream room, where the guidance information is used to guide the user to follow the virtual interactive object into the second live stream room, and the second live stream room uses a second virtual streamer for a live stream, and the guidance information is displayed on the live stream interface of the first live stream room. Among them, the guiding information can be images or characters displayed based on the virtual interactive object, or voices played based on the virtual interactive object, which can guide the user into other live stream rooms, expand live streams watched by the user and help the user to learn more live videos.

Based on the second application scenario, in an optional example, the method further includes: making the virtual interactive object appear in the second live stream room. A way in which the virtual interactive object appears in the second live stream room is the same or different from a way in which the virtual interactive object appears in the first live stream room, and time in which the virtual interactive object appears in the second live stream room is the same or different from time in which the virtual interactive object appears in the first live stream room. The time and mode of the virtual interactive object appearing in different live stream rooms can be set for different live stream rooms, which is more flexible and improves viewing experience of the user when switching between different live stream rooms.

Figure 5:
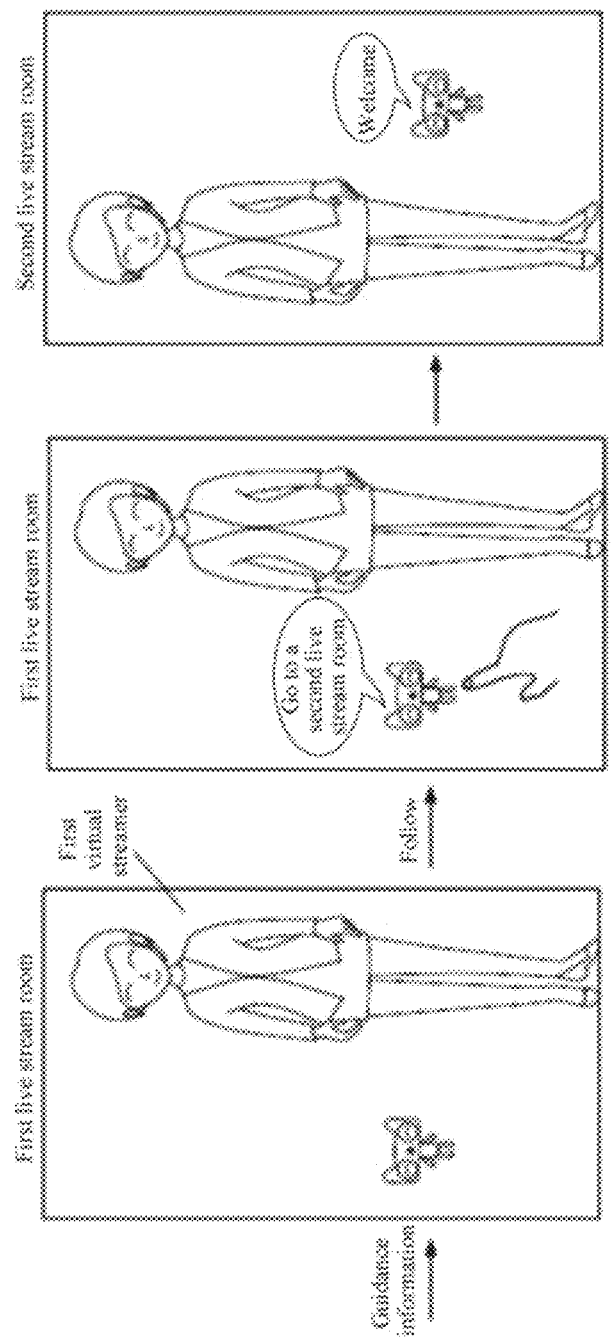
FIG. 5 is a schematic diagram of an interactive effect provided by embodiment 1 of the present application.

Based on the second application scenario, in another optional example, the method further includes receiving an input of the user to follow the virtual interactive object, so that a viewing picture of the user is switched from the first live stream room to the second live stream room. The user can switch live stream rooms through the input operation of following the virtual interactive object, which is convenient to operate. For example, the user can follow the virtual interactive object by clicking the virtual interactive object through touch operation, and can also follow the virtual interactive object by clicking a preset following button through touch operation. As shown in FIG. 5, if the electronic device is a terminal device, the terminal device can display the guidance information based on the virtual interactive object. In the process of displaying the guidance information, if the user clicks the virtual interactive object or the guidance information, the second live stream room is switched to.

It should also be noted that appearing opportunity, appearing effect and leaving effect of the virtual interactive objects can be set in advance to improve interactive experience of the user. Here, two specific examples are listed for illustration.

In an implementation, in a first example, the appearing opportunity is illustrated, and the method further includes: acquiring appearing time point when the virtual interactive object appears in the first live stream room, and the appearing time point is randomly set. When the current time reaches the appearing time point, the virtual interactive object appears in the first live stream room. It should be noted that the appearing time point of the virtual interactive object in each live stream room can be randomly set, and the virtual interactive object can appear in multiple live stream rooms at the same time, or only in one live stream room, which is not limited by the present application.

Figure 6:
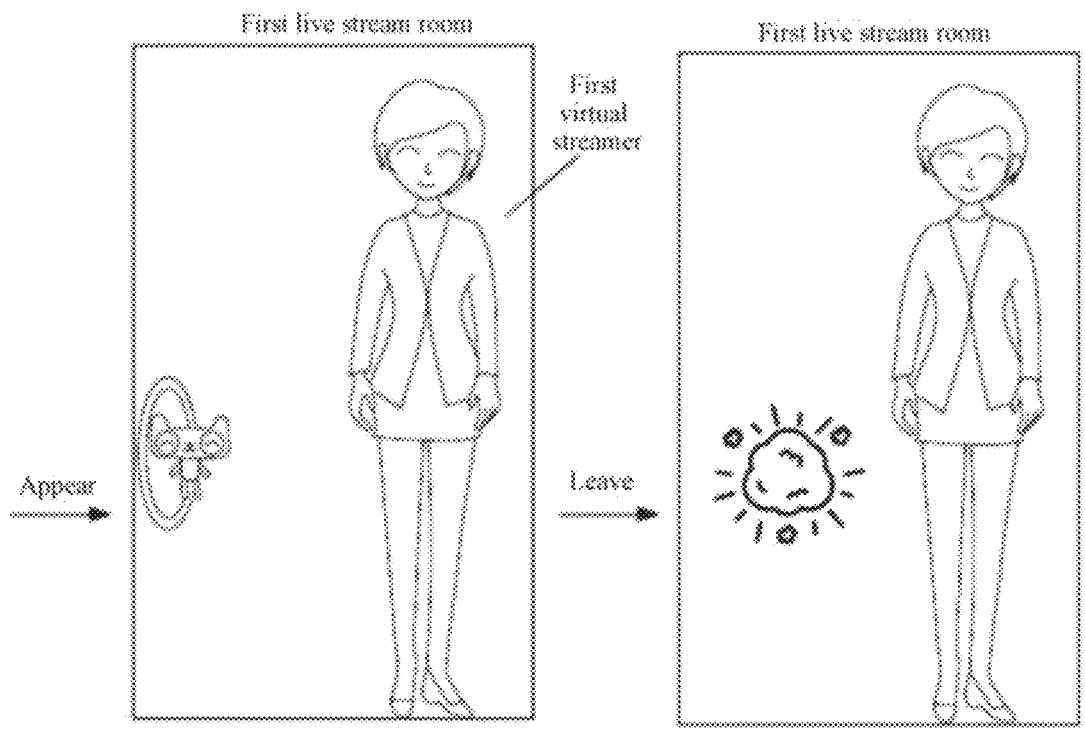
FIG. 6 is a schematic diagram of an interactive effect provided by embodiment 1 of the present application.

In an implementation, in a second example, the appearing effect and the leaving effect are illustrated, and the method further includes: when the virtual interactive object appears in the first live stream room, displaying visual effect and/or sound effect of the virtual interactive object appearing in the first live stream room on the display interface of the first live stream room. When the virtual interactive object leaves the first live stream room, displaying visual effect and/or sound effect of the virtual interactive object leaving the first live stream room on the display interface of the first live stream room. Illustratively, visual effect of entering may include that the virtual interactive object enters from a door or a window of the first live stream room, or the virtual interactive object enters from far to near, or the virtual interactive object enters from a side of the live stream interface of the first live stream room, or the virtual interactive object enters from a portal, etc. The visual effect of leaving may or may not correspond to the visual effect of entering. Illustratively, the visual effect of leaving may include that the virtual interactive object leaves from the door or the window of the first live stream room, or that the virtual interactive object leaves from near to far, or that the virtual interactive object leaves from the side of the live stream interface of the first live stream room, or that the virtual interactive object disappears in a smoke effect. Sound effects can include various sound effects, such as meowing, ringing, music, etc., which are not listed here. As shown in FIG. 6, which shows that when the virtual interactive object enters the first live stream room, the virtual interactive object enters through the circular portal, and disappears in the smoke effect when it leaves.

In combination with the corresponding illustration of FIG. 1-FIG. 6, here, taking the electronic device being the terminal device as an example, the above virtual object interaction method will be described.

In a specific example, taking the electronic device being a server as an example, the server can send the live video of the first virtual streamer to the terminal device for the terminal device to display. After receiving the live video of the first virtual streamer sent by the server, the terminal device displays the live stream interface of the first live stream room of the live stream platform and plays the live video of the first virtual streamer. According to the randomly set appearing time point, when the current time reaches the appearance time point, the terminal device displays the virtual interactive object on the live interface of the first live stream room, which can specifically display the appearing visual effect of the virtual interactive object. The terminal device can acquire the interactive information and display the interactive information based on the virtual interactive object. After the virtual interactive object appears in the first live stream room for a preset time period, the terminal device displays the leaving visual effect of the virtual interactive object. This is only an exemplary explanation, and please refer to the above-mentioned embodiments for detailed explanation, which is not repeated here.

In the virtual object interaction method provided by the embodiment of the present application, a first virtual streamer is used for a live stream in a first live stream room of a live stream platform. During a live stream of the first live stream room, the virtual interactive object appears in the first live stream room for a preset time period, and the preset time period is shorter than a time period of live stream of the first live stream room. The first virtual streamer performs a live stream task set by a using party of the first live stream room, and the virtual interactive object performs an interactive task set by a manager of the live stream platform. As the virtual interactive object performs the interactive task set by the manager of the live stream platform and does not interfere with the live stream task performed by the virtual streamer, interaction in the live stream room is increased and the live stream effect is improved without affecting the live stream task.

Embodiment 2

Figure 7:
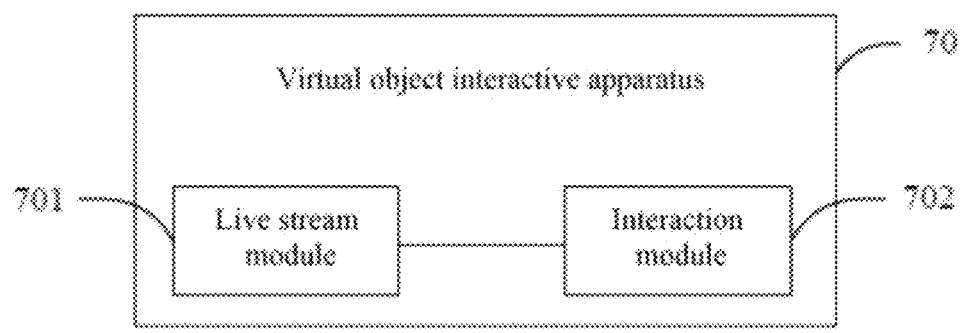
FIG. 7 is a structural diagram of a virtual object interaction apparatus provided by embodiment 2 of the present application.

Based on the method described in the embodiment 1, embodiment 2 of the present application provides a virtual object interaction apparatus for executing the method described in above embodiment 1. The virtual object interaction apparatus is applied for a live stream platform, and the live stream platform provides one or more live stream rooms for a using party to conduct a live stream activity. As shown in FIG. 7, the virtual object interaction apparatus 70 includes:

a live stream module 701, configure to establish a first live stream room on the live stream platform to perform a live stream by using a first virtual streamer;

an interaction module 702, configured to make a virtual interactive object appear in the first live stream room for a preset time period during the live stream of the first live stream room, and the preset time period is shorter than a time period of the live stream in the first live stream room; and the first virtual streamer performs a live stream task set by the using party of the first live stream room, and the virtual interactive object performs an interactive task set by a manager of the live stream platform.

In an implementation, in a specific example, the interaction module 702 is further configured to generate interactive information based on the virtual interactive object, and the interactive information is related to the interactive task performed by the virtual interactive object.

In an implementation, in a specific example, the interaction module 702 is configured to display an interactive prompt related to the virtual interactive object, and the interactive prompt is configured to prompt a user to make an interactive input; receive user's interactive input to the virtual interactive object, and generate interactive information according to the interactive input.

In an implementation, in a specific example, the interaction module 702 is configured to determine an interaction behavior corresponding to the virtual interactive object according to the interaction input, and generate the interaction information based on the interaction behavior, and the interaction behavior includes an action and a gesture of the virtual interactive object interacting with the user.

In an implementation, in a specific example, the interaction module 702 is configured to obtain key information of a live stream target included in a live stream content according to the live stream content of the first virtual streamer, and generate the interactive information based on the key information.

In an implementation, in a specific example, the interaction module 702 is configured to obtain text information of the live stream content of the first virtual streamer; perform a semantic recognition on the text information, and determine the live stream target included in the live stream content according to a result of the semantic recognition, and obtain the key information of the live stream target.

In an implementation, in a specific example, the interaction module 702 is configured to provide guidance information corresponding to a second live stream room when the virtual interactive object appears in the first live stream room of the live stream platform, and the guidance information is used to guide the user to follow the virtual interactive object into the second live stream room, where the second live stream room uses a second virtual streamer for a live stream; and display guidance information on the live interface of the first live stream room.

In an implementation, in a specific example, the interaction module 702 is further configured to make the virtual interactive object appear in the second live stream room, the way in which the virtual interactive object appears in the second live stream room is the same as or different from the way in which the virtual interactive object appears in the first live stream room, and time at which the virtual interactive object appears in the second live stream room is the same as or different from time at which the virtual interactive object appears in the first live stream room.

In an implementation, in a specific example, the live stream module 701 is further configured to receive the user's input to follow the virtual interactive object, so that a viewing picture of the user switches from the first live stream room to the second live stream room.

In an implementation, in a specific example, the interaction module 702 is further configured to obtain an appearing time point at which the virtual interactive object appears in the first live stream room, and the appearing time point is randomly set; make the virtual interactive object appear in the first live stream room when current time reaches the appearing time point.

In an implementation, in a specific example, the interaction module 702 is further configured to display visual effect and/or sound effect of the virtual interactive object appearing in the first live stream room on the display interface of the first live stream room when the virtual interactive object appears in the first live stream room; and display visual effect and/or sound effect of the virtual interactive object leaving the first live stream room on the display interface of the first live stream room when the virtual interactive object leaves the first live stream room.

In the virtual object interactive apparatus provided by the embodiment of the present application, a first virtual streamer is used for a live stream in a first live stream room of a live stream platform. During a live stream of the first live stream room, the virtual interactive object is made appear in the first live stream room for a preset time period, and the preset time period is shorter than a time period of live stream of the first live stream room. The first virtual streamer performs a live stream task set by a using party of the first live stream room, and the virtual interactive object performs an interactive task set by a manager of the live stream platform. As the virtual interactive object performs the interactive task set by the manager of the live stream platform and does not interfere with the live stream task performed by the virtual streamer, interaction of the live stream room is increased and live stream effect is improved without affecting the live stream task.

Embodiment 3

Figure 8:
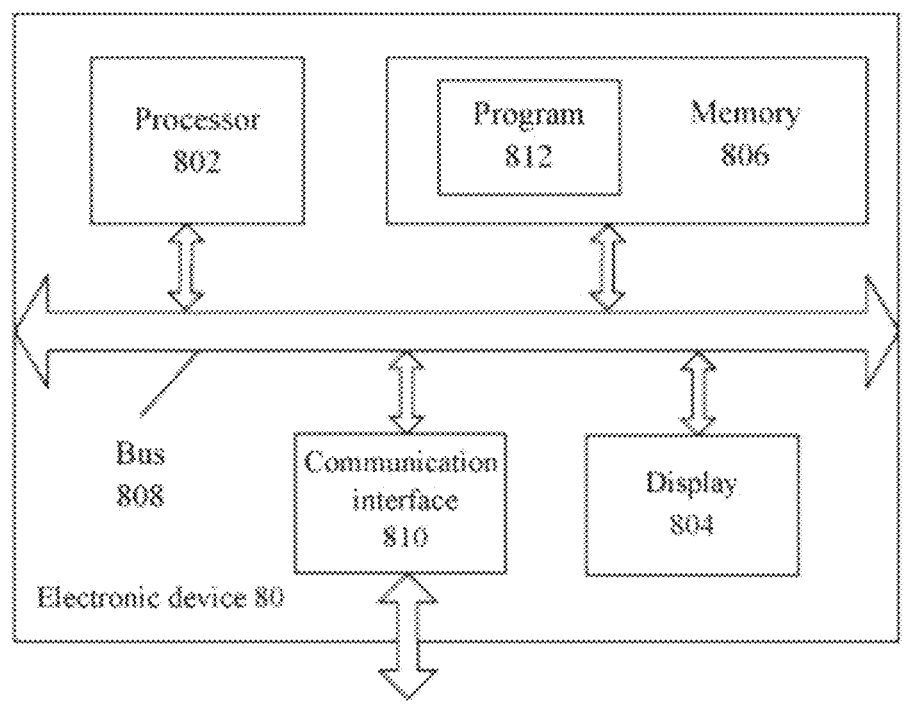
FIG. 8 is a structural diagram of an electronic device provided by embodiment 3 of the present application.

Based on the method described in Embodiment 1 above, Embodiment 3 of the present application provides an electronic device for executing the method described in Embodiment 1 above. Referring to FIG. 8, which illustrates a structural schematic diagram of an electronic device according to Embodiment 3 of the present application, and the specific embodiment of the present application does not limit the specific implementation of the electronic device.

As shown in FIG. 8, the electronic device 80 may include:
a processor 802, a display 804 and a memory 806;
among them:
the display 804 is configured to display a live stream interface of a live stream room, and the live stream interface includes a streamer area and an interactive area, wherein the streamer area is used to display a virtual streamer and the interactive area is used to display a virtual interactive object;
a memory 806 is configured to store executable instructions and data related to the virtual object interaction method;
the processor 802 is configured to execute the operation corresponding to the virtual object interaction method according to the executable instructions and data read from the memory.

In an implementation, in a specific implementation, the electronic device 80 further includes a communication bus 808 and a communication interface 810. The processor 802, the display 804, the memory 806 and the communication interface 810 communicate with each other through the communication bus 808.

A communication interface 810 is configured to communicate with other electronic devices or servers.

The processor 802 is configured to execute a program 812, and can specifically execute the relevant steps in the above-mentioned embodiment of the virtual object interaction method.

Specifically, the program 812 may include program code including computer operating instructions.

The processor 802 may be a processor CPU, or an application specific integrated circuit (ASIC), or one or more integrated circuits configured to implement embodiments of the present application. One or more processors included in an intelligent device can be the same type of processors, such as one or more CPU, or can also be different types of processors, such as one or more CPUs and one or more ASICs.

A memory 806 is configured to store the program 812. The memory 806 may include a high-speed RAM memory, and may also include a non-volatile memory, such as at least one disk memory.

The program 812 can be specifically used to cause the processor 802 to execute to realize the virtual object interaction method described in the embodiment 1. For the specific implementation of each step in the program 812, please refer to the corresponding descriptions in the corresponding steps and units in the above-mentioned embodiment of the virtual object interaction method, which will not be repeated here. It can be clearly understood by those skilled in the art that, for the convenience and conciseness of description, the specific working processes of the devices and modules described above can refer to the corresponding process descriptions in the aforementioned method embodiments, and will not be repeated here.

In the electronic device provided by the embodiment of the present application, a first virtual streamer is used for a live stream in a first live stream room of a live stream platform. During a live stream of the first live stream room, the virtual interactive object is made appear in the first live stream room for a preset time period, and the preset time period is shorter than a time period of live stream of the first live stream room. The first virtual streamer performs a live stream task set by a using party of the first live stream room, and the virtual interactive object performs an interactive task set by a manager of the live stream platform. As the virtual interactive object performs the interactive task set by the manager of the live stream platform and does not interfere with the live stream task performed by the virtual streamer, interaction in the live stream room is increased and the live stream effect is improved without affecting the live stream task.

Embodiment 4

Based on the method described in Embodiment 1 above, embodiment 4 of the present application provides a computer storage medium on which a computer program is stored, which, when executed by a processor, realizes the method as described in Embodiment 1.

Embodiment 5

Based on the method described in Embodiment 1 above, embodiment 5 of the present application provides a computer program product which, when executed by a processor, realizes the method as described in Embodiment 1.

It should be pointed out that, according to the needs of implementation, each component/step described in the embodiments of the present application can be split into more components/steps, and two or more components/steps or partial operations of components/steps can be combined into new components/steps to achieve the purpose of the embodiments of the present application.

The above-mentioned method according to the embodiment of the present application can be implemented in hardware, firmware, or implemented as software or computer code that can be stored in a recording medium (such as CD ROM, RAM, floppy disk, hard disk or magneto-optical disk), or computer code that was originally stored in a remote recording medium or a non-transitory machine-readable medium downloaded through a network and will be stored in a local recording medium, so that the method described herein can be processed by such software stored on the recording medium using a general-purpose computer, a dedicated processor, or programmable or dedicated hardware (such as ASIC or FPGA). It can be understood that a computer, processor, microprocessor controller or programmable hardware includes a storage component (e.g., RAM, ROM, flash memory, etc.) that can store or receive software or computer code, and when the software or computer code is accessed and executed by the computer, processor or hardware, the method described herein is realized. Furthermore, when a general-purpose computer accesses the code for implementing the method shown here, the execution of the code converts the general-purpose computer into a dedicated computer for executing the method shown here.

Those skill in the art can realize that the units and method steps of various examples described in connection with the embodiments disclosed herein can be implemented in electronic hardware, or a combination of computer software and electronic hardware. Whether these functions are implemented in hardware or software depends on specific application and design constraints of the technical scheme. Those skilled in the art can use different methods for each specific application to realize the described functions, but this realization should not be considered beyond the scope of the embodiments of the present application.

The above embodiments are only used to illustrate the embodiments of the present application, but not to limit the embodiments of the present application. Those skilled in the art can make various changes and modifications without departing from the spirit and scope of the embodiments of the present application, all equivalent technical solutions also belong to the scope of the embodiments of the present application, and the patent protection scope of the embodiments of the present application should be defined by the claims.

The invention claimed is:

1. A method of virtual object interaction, applied to a live stream platform configured to provide one or more live stream rooms for a using party to conduct a live stream activity, the method comprising:
    performing a live stream by using a first virtual streamer in a first live stream room of the live stream platform;
    making a virtual interactive object appear in the first live stream room for a preset time period during the live stream of the first live stream room, the preset time period being shorter than a time period of the live stream of the first live stream room;
    obtaining an appearing time point when the virtual interactive object appears in the first live stream room, the appearing time point being randomly set; and
    making the virtual interactive object appear in the first live stream room when current time reaches the appearing time point, wherein the first virtual streamer performs a live stream task set by the using party of the first live stream room, and the virtual interactive object performs an interactive task set by a manager of the live stream platform.

2. The method according to claim 1, wherein the method further comprises:
generating interactive information based on the virtual interactive object, wherein the interactive information is related to the interactive task to be performed by the virtual interactive object.

3. The method according to claim 2, wherein the generating interactive information based on the virtual interactive object comprises:
displaying an interactive prompt related to the virtual interactive object, wherein the interactive prompt is used to prompt a user to perform an interactive input; and
receiving the interactive input of the user to the virtual interactive object, and generating the interactive information according to the interactive input.

4. The method according to claim 3, wherein the generating the interactive information according to the interactive input comprises:
determining an interactive behavior corresponding to the virtual interactive object according to the interactive input, and generating the interactive information based on the interactive behavior, wherein the interactive behavior includes an action and a posture of the virtual interactive object interacting with the user.

5. The method according to claim 2, wherein the generating interactive information based on the virtual interactive object comprises:
obtaining key information of a live stream target included in a live stream content according to the live stream content of the first virtual streamer, and generating the interactive information based on the key information.

6. The method according to claim 5, wherein the obtaining key information of the live stream target included in a live stream content according to the live stream content of the first virtual streamer comprises:
obtaining text information of the live stream content of the first virtual streamer; and
performing a semantic recognition on the text information, determining the live stream target included in the live stream content according to a result of the semantic recognition, and obtaining the key information of the live stream target.

7. The method according to claim 1, wherein the method further comprises:
providing guidance information corresponding to a second live stream room when the virtual interactive object appears in the first live stream room of the live stream platform, wherein the guidance information is used for guiding a user to follow the virtual interactive object into the second live stream room, and the second live stream room performs a live stream using a second virtual streamer; and
displaying the guidance information on the live interface of the first live stream room.

8. The method according to claim 7, wherein the method further comprises:
making the virtual interactive object appear in the second live stream room;
wherein a way in which the virtual interactive object appears in the second live stream room is the same or different from a way in which the virtual interactive object appears in the first live stream room, and time at which the virtual interactive object appears in the second live stream room is the same or different from time at which the virtual interactive object appears in the first live stream room.

9. The method according to claim 7, wherein the method further comprises:
receiving an input of the user to follow the virtual interactive object, so that a viewing picture of the user switches from the first live stream room to the second live stream room.

10. The method according to claim 1, wherein the method further comprises:
displaying at least one of visual effect or sound effect of the virtual interactive object appearing in the first live stream room on a display interface of the first live stream room when the virtual interactive object appears in the first live stream room; and
displaying at least one of visual effect or sound effect of the virtual interactive object leaving the first live stream room on the display interface of the first live stream room when the virtual interactive object leaves the first live stream room.

11. A virtual object interactive apparatus, applied to a live stream platform which provides one or more live stream rooms for a using party to conduct a live stream activity, the virtual object interactive apparatus comprising:
at least one memory that stores computer executable instructions; and
at least one processor configured to execute the computer executable instructions stored in the memory to:
establish a first live stream room on the live stream platform to perform a live stream by using a first virtual streamer;
make a virtual interactive object appear in the first live stream room for a preset time period during the live stream of the first live stream room, the preset time period being shorter than a time period of the live stream in the first live stream room;
obtain an appearing time point when the virtual interactive object appears in the first live stream room, the appearing time point being randomly set; and
make the virtual interactive object appear in the first live stream room when current time reaches the appearing time point,
wherein the first virtual streamer performs a live stream task set by the using party of the first live stream room, and the virtual interactive object performs an interactive task set by a manager of the live stream platform.

12. The virtual object interactive apparatus according to claim 11, wherein the at least one processor executes the computer executable instructions to further execute the following operation:
generating interactive information based on the virtual interactive object, wherein the interactive information is related to the interactive task to be performed by the virtual interactive object.

13. The virtual object interactive apparatus according to claim 12, wherein the at least one processor executes the computer executable instructions to further execute the following operations:
displaying an interactive prompt related to the virtual interactive object, wherein the interactive prompt is used to prompt a user to perform an interactive input; and receiving the interactive input of the user to the virtual interactive object, and generating the interactive information according to the interactive input.

14. The virtual object interactive apparatus according to claim 13, wherein the at least one processor executes the computer executable instructions to further execute the following operations:

determining an interactive behavior corresponding to the virtual interactive object according to the interactive input, and generating the interactive information based on the interactive behavior, wherein the interactive behavior includes an action and a posture of the virtual interactive object interacting with the user.

15. The virtual object interactive apparatus according to claim 12, wherein the at least one processor executes the computer executable instructions to further execute the following operations:

obtaining key information of a live stream target included in a live stream content according to the live stream content of the first virtual streamer, and generating the interactive information based on the key information.

16. The virtual object interactive apparatus according to claim 15, wherein the at least one processor executes the computer executable instructions to further execute the following operations:

obtaining text information of the live stream content of the first virtual streamer; and performing a semantic recognition on the text information, determining the live stream target included in the live stream content according to a result of the semantic recognition, and obtaining the key information of the live stream target.

17. The virtual object interactive apparatus according to claim 11, wherein the at least one processor executes the computer executable instructions to further execute the following operations:

providing guidance information corresponding to a second live stream room when the virtual interactive object appears in the first live stream room of the live stream platform, wherein the guidance information is used for guiding a user to follow the virtual interactive object into the second live stream room, and the second live stream room performs a live stream using a second virtual streamer; and displaying the guidance information on the live interface of the first live stream room.

18. The virtual object interactive apparatus according to claim 17, wherein the at least one processor executes the computer executable instructions to further execute the following operation:

making the virtual interactive object appear in the second live stream room;

wherein a way in which the virtual interactive object appears in the second live stream room is the same or different from a way in which the virtual interactive object appears in the first live stream room, and time at which the virtual interactive object appears in the second live stream room is the same or different from time at which the virtual interactive object appears in the first live stream room.

19. A non-transitory storage medium, on which a computer program is stored, which, when executed by a processor, causes the processor to execute the following operations:

performing a live stream by using a first virtual streamer in a first live stream room of a live stream platform;

making a virtual interactive object appear in the first live stream room for a preset time period during the live stream of the first live stream room, the preset time period being shorter than a time period of the live stream of the first live stream room;

obtaining an appearing time point when the virtual interactive object appears in the first live stream room, the appearing time point being randomly set; and making the virtual interactive object appear in the first live stream room when current time reaches the appearing time point, wherein the first virtual streamer performs a live stream task set by a using party of the first live stream room, and the virtual interactive object performs an interactive task set by a manager of the live stream platform.

* * * * *